United States Patent [19]

Thut

[11] Patent Number: 5,676,520
[45] Date of Patent: Oct. 14, 1997

[54] METHOD AND APPARATUS FOR INHIBITING OXIDATION IN PUMPS FOR PUMPING MOLTEN METAL

[76] Inventor: Bruno H. Thut, 16755 Park Circle Dr., Chagrin Falls, Ohio 44023

[21] Appl. No.: 474,512

[22] Filed: Jun. 7, 1995

[51] Int. Cl.$^6$ ............................................. F01D 15/00
[52] U.S. Cl. .................... 415/121.3; 415/200; 266/235; 266/239
[58] Field of Search ....................... 415/116, 200, 415/121.3; 266/235, 239

[56] References Cited

U.S. PATENT DOCUMENTS

| | | |
|---|---|---|
| 2,948,524 | 8/1960 | Sweeney. |
| 3,255,702 | 6/1966 | Gehrm. |
| 3,291,473 | 12/1966 | Sweeney. |
| 3,573,895 | 4/1971 | Ostberg ............................ 266/235 |
| 3,719,436 | 3/1973 | McFarlin. |
| 3,836,280 | 9/1974 | Koch. |
| 3,982,913 | 9/1976 | Feichtinger ....................... 266/235 |
| 4,052,199 | 10/1977 | Mangalick. |
| 4,059,251 | 11/1977 | Huzyak ............................. 266/235 |
| 4,169,584 | 10/1979 | Mangalick. |
| 4,351,514 | 9/1982 | Koch. |
| 4,786,230 | 11/1988 | Thut. |
| 4,898,367 | 2/1990 | Cooper. |
| 4,930,986 | 6/1990 | Cooper. |
| 4,940,384 | 7/1990 | Amra et al.. |
| 4,954,167 | 9/1990 | Cooper. |
| 5,058,865 | 10/1991 | Robertson ......................... 266/239 |
| 5,092,821 | 3/1992 | Gilbert et al.. |
| 5,119,977 | 6/1992 | Moschini .......................... 266/239 |
| 5,143,357 | 9/1992 | Gilbert et al.. |
| 5,177,035 | 1/1993 | Gee et al.. |
| 5,181,828 | 1/1993 | Gilbert et al. ..................... 415/200 |
| 5,203,681 | 4/1993 | Cooper. |
| 5,213,468 | 5/1993 | Sexton et al. ..................... 415/121.3 |
| 5,308,045 | 5/1994 | Cooper. |
| 5,310,412 | 5/1994 | Gilbert et al.. |
| 5,330,328 | 7/1994 | Cooper. |
| 5,366,207 | 11/1994 | Lin ................................... 266/235 |
| 5,421,562 | 6/1995 | Vander Jagt ....................... 266/239 |

FOREIGN PATENT DOCUMENTS

| | | | |
|---|---|---|---|
| 1264126 | 1/1990 | Canada. | |
| 3614044 | 11/1987 | Germany ............................ | 415/121.3 |
| 5-117771 | 5/1993 | Japan ................................. | 266/235 |
| 5-117772 | 5/1993 | Japan ................................. | 266/235 |

OTHER PUBLICATIONS 14 pg Operating Instruction Booklet for Metaullics Circulation System for Aluminum Metaullics Systems Co, Copyright 1984.

Two page Advertisement Describing Exhibit, High Temperature Systems, Inc, 1995 TMS Annual Meeting Exhibition.

5 pg Article for Reduced Fuel Consumption Through . . . Mechanized Molten Metal Circulation, The Carborundum Co., Published by The Society of Die Casting Engineers, vol. 17, No. 5, pp. 22–31, Sep.–Oct. 1973.

One page Advertising Brochure, New L–Series Pumps, Metaullics Systems Co, L.P., undated.

29 page Operating Instruction Booklet, H.T.S. Pump Equation for the Eighties, High Temperature Systems, Inc., undated.

Pg. 330–340 (Chpt. 11) from Physics, Worth Publishers, Inc. Copyright 1982.

(List continued on next page.)

*Primary Examiner*—John T. Kwon
*Attorney, Agent, or Firm*—Watts, Hoffmann, Fisher & Heinke Co.

[57] ABSTRACT

In a pump for pumping molten metal including a motor and a shaft connected at an upper end to the motor and at a lower end to an impeller which is rotatable in a molten metal bath, the improvement being an apparatus for impeding oxidation of the shaft, including a gas source for releasing gas and a gas feed tube in fluid communication with the gas source, the gas feed tube being positioned to direct gas along the outer surface of the shaft.

12 Claims, 2 Drawing Sheets

OTHER PUBLICATIONS

One pg Advertisement for L Series Molten Metal Pumps by Metaullics Systems Co., undated.

One pg. Advertisement for M Series Aluminum Molten Metal Pumps by Metallics Systems Co., undated.

One pg Schematic Drawing of a Molten Metal Pump, Source Unknown, undated.

Six pg Brochure for "M Series" Molten Metal pumps by Metaullics Systems Co., Copyright 1984.

16 pg Operating Instruction Booklet for Metaullics Transfer Pumps for Moten Metal by the Carborundum Co, Copyright 1980.

16 pg Operating Instruction Booklet for Metaullics De–Gas/De–Mag Systems for Aluminum, Metaullics Systems Co., dated Apr. 1, 1985.

16 pg Operating Instruction Booklet for Metaullics Transfer Pump Systems for Molten Metals, Metaullics Systems Co., Copyright 1984.

4 pg Folder Listing Models of Molten Metal Pumps by High Temperature Systems, Inc., Published at Least as Early as Jun., 1990.

1 pg Advertisement for Replacement parts for M9000CSD Gas Injection Pump, High Temperature Systms, Inc., Pub. at Least as Early as Oct., 1986.

1 pg Adv. for Replacement Parts for A5000C and A9000C Molten Metal Pump, High Temp. Systems, Pub. at Least as Early as Sep., 1977.

1 pg Adv. for Replacement Parts for M5000CSD Gas Injection Pump, High Temperature Systems, Pub. at Least as Early as Oct., 1986.

1 pg Adv. for Replacement Parts for M5000C Molten Metal Pump, High Temperature Systems, Inc., dated Jul. 1986.

4 pg Installation Booklet for Mark II Molten Metal pumps, High Temperature Systems, Inc., Pub. at Least as Early as Sep. 1973.

METHOD AND APPARATUS FOR INHIBITING OXIDATION IN PUMPS FOR PUMPING MOLTEN METAL

BACKGROUND OF THE INVENTION

This invention relates to the field of pumps for pumping molten metal and, more particularly, to method and apparatus for inhibiting oxidation in such pumps.

Pumps used for pumping molten metal typically include a motor carried by a motor mount, a shaft connected to the motor at an upper end, and an impeller connected to the lower end of the shaft. Such pumps may also include a base with an impeller chamber, the impeller being rotatable in the impeller chamber. A volute member may be employed in the impeller chamber. The pump components that contact the molten metal are composed of a refractory material such as graphite.

The pumps commonly used to pump molten metal are one of three types, transfer pumps, discharge pumps, and circulation pumps, as disclosed in the publication "H.T.S. Pump Equation for the Eighties" by High Temperature Systems, Inc., which is incorporated herein by reference in its entirety.

A transfer pump transfers molten metal out of one furnace to another furnace or into a ladle. The transfer pump has all of the pump components described above. A tubular riser extends vertically from the base chamber to the motor mount and contains a passageway for molten metal. Support posts are also provided between the base and the motor mount.

A discharge pump transfers molten metal from one bath chamber through a submerged pipe to another bath chamber. Such a pump typically includes a shaft sleeve and support posts between the base and the motor mount, but has no riser.

A circulation pump circulates molten metal to improve alloy homogenization, among other things. A circulation pump may be configured without a base, shaft sleeve, support posts or riser, having only an impeller connected to a shaft sleeve immersed in the molten metal, as described in U.S. Pat. No. 5,143,357 to Gilbert et al., issued Sept. 1, 1992. However, a circulation pump could include all of the pump components described above except a riser.

The operation of all three types of pumps is similar. The pump is lowered into a bath of molten metal and secured in place. The motor is activated and rotates the shaft via a coupling assembly between the shaft and motor. The shaft then rotates the impeller, thereby effecting fluid flow of the molten metal.

In the operation of circulation pumps without a base, the molten metal is then circulated in the furnace by rotation of the impeller on the end of the shaft. In circulation pumps having a base, rotation of the impeller draws molten metal into the impeller chamber of the base and out of an outlet of the base in a desired direction.

In the operation of transfer pumps, rotation of the impeller draws molten metal into the impeller chamber of the base and out a base outlet to the riser. The molten metal then passes through the riser and is removed from the pump.

In the operation of discharge pumps, rotation of the impeller draws molten metal into the inlet and out of the outlet of the base. The molten metal then passes through the submerged pipe into another bath chamber.

Pumps which employ a base may either be top feed pumps or bottom feed pumps depending, among other things, on the configuration of the base and orientation of the impeller vanes relative to the direction of shaft rotation. Multiple impellers and volutes may be used, as disclosed in U.S. Pat. No. 4,786,230 to Thut, which is incorporated herein by reference in its entirety.

Molten metal creates a hostile environment for components of these pumps. A molten metal aluminum bath, for example, is very corrosive, and abrasive drosses are present at the interface between the molten metal and the atmosphere. Graphite pump components such as the shaft and base are rapidly oxidized, and hence eroded, in the molten aluminum and in the atmosphere above it.

Heretofore, there has not been a satisfactory way to prevent oxidation of the pump components. Usually, the pump is removed from the molten metal and the oxidized and eroded shaft and base are replaced. Removing the pump from the molten metal for replacing pump components results in down time of the pump, which is undesirable because it decreases efficient pumping of the molten metal.

Some pumps include gas injection apparatuses for introducing gas into the molten metal. In a process known as degassing, gas is introduced into the molten metal to remove dissolved gases such as hydrogen. Degassing uses argon, which is the most effective gas, or nitrogen, which is the cheapest gas. In a process known as demagging, gas is introduced into the molten metal to remove dissolved metals such as magnesium. Chlorine gas is used for demagging and forms $MgCl_2$ upon reacting with the molten metal. The components of these gas injection type pumps also suffer from rapid oxidation due to contact with the molten metal environment, which requires that they be replaced frequently.

SUMMARY OF THE INVENTION

Pumps for pumping molten metal constructed or modified in accordance with the gas injection apparatus of the invention overcome the oxidation problems suffered by conventional pumps. Such pumps are also suitable for conventional molten metal degassing and demagging.

The pump for pumping molten metal of the invention includes a motor carried by a motor mount. A shaft is connected at a first end to the motor and at a second end to an impeller which is rotatable in a molten metal bath. A gas feed apparatus includes a source of gas and a gas feed tube in fluid communication with the source of gas. The gas feed tube directs the gas along an outer surface of the shaft for impeding the deposit of oxidation formations on it. The gas feed tube includes an outlet end portion adjacent the shaft. A refractory shield member is connected to the motor mount above the gas feed tube outlet end. The refractory shield prevents splashes of molten metal from contacting sensitive pump components such as the motor. The gas source is adapted to inject into the molten metal a gas that includes one or more gases selected from the group consisting of argon, zenon, krypton and nitrogen.

In preferred form, the gas feed apparatus of the invention is used in a pump having a shaft sleeve extending between the motor mount and the base with an inner wall defining a tubular opening in which the shaft is rotatable. The gas feed tube is disposed at a location to inject gas from the gas source into the shaft sleeve.

A method of impeding oxidation in a pump for pumping molten metal in accordance with the invention includes the steps of operating the pump to rotate the impeller on the end of the shaft in the molten metal. Gas is injected from the gas source through the gas feed tube down the shaft. The injected gas forms a barrier around the shaft to prevent air from contacting, and hence eroding, the shaft through oxidation. This prolongs the useful life of the shaft. In addition, the injected gas degases the molten metal.

In preferred form, the method of impeding oxidation formations in a pump for pumping molten metal includes the steps of injecting gas through the gas feed tube and into the shaft sleeve. Gas that is either heavier or lighter than air is used. The injected gas impedes oxidation of the shaft by displacing air in the shaft sleeve around the shaft. The shaft is then rotated in the injected gas in the shaft sleeve. If a gas that is lighter than air is used, the shaft sleeve is pressurized by disposing a gasket around the shaft at the upper end of the shaft sleeve to substantially seal the shaft sleeve from air outside the shaft sleeve.

Another reason the shaft sleeve is pressurized is to reduce the height of the molten metal in the shaft sleeve. With less molten metal in the shaft sleeve, less torque is needed to rotate the shaft. Gas that is either lighter or heavier than air may be used to reduce the level of molten metal in the shaft sleeve. The gas is injected into the shaft sleeve at a pressure sufficient to reduce the level of the molten metal therein. The invention is advantageous because it impedes oxidation of the shaft by creating a gas barrier that displaces air around the shaft. It is difficult for air in the molten metal to penetrate this gas barrier. This simultaneously prevents oxidation of the shaft and permits molten metal degassing.

The invention also relates to a method of cleaning a pump for pumping molten metal including a base having inner walls defining an impeller chamber. In this method gas is injected into the impeller chamber. The impeller is rotated in the injected gas in the impeller chamber to produce cavitation that dislodges oxidation formations from the impeller chamber walls. The dislodged oxidation formations are then removed from the impeller chamber. Suitable gases for this method are those selected from the group consisting of chlorine, nitrogen and argon.

In preferred form, the present method of cleaning a pump uses a pressurized shaft sleeve. This method is conducted as a cleaning cycle separate from normal pumping of the molten metal because excessive chlorine degrades the pump components. To this end, the method includes the steps of interrupting normal pumping of the molten metal before the gas injection step and resuming normal pumping of the molten metal after the step of removing dislodged deposits. The cavitation dislodges the oxidation formations from the impeller chamber and cleans the impeller chamber without the need for removing the pump from the molten metal or disassembling it.

Other embodiments of the invention are contemplated to provide particular features and structural variants of the basic elements. The specific embodiments referred to as well as possible variations and the various features and advantages of the invention will become better understood from the detailed description that follows, when considered in connection with the accompanying drawings.

DESCRIPTION OF PREFERRED EMBODIMENTS

Figure 1:
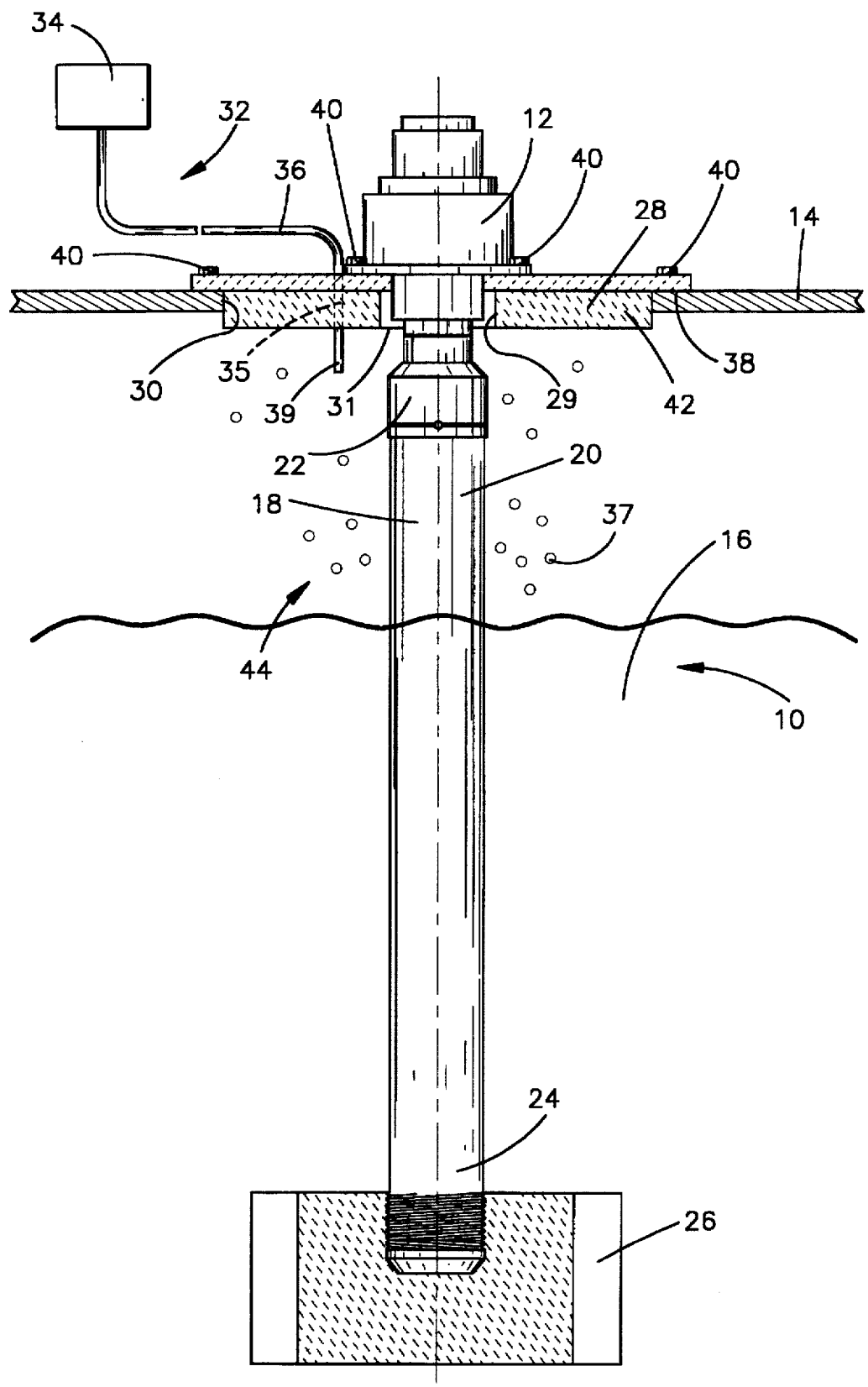
FIG. 1 is a vertical cross-sectional view of a pump for pumping molten metal and a schematic illustration of a gas feed apparatus constructed in accordance with the invention.

Referring now to the drawings and to FIG. 1 in particular, the illustrated pump is a pump generally designated by reference numeral 10. The pump 10 includes a motor 12 carried by a motor mount 14 supported above a bath of molten metal 16. The molten aluminum 16 may include aluminum, zinc, copper, iron and alloys thereof. A shaft 18 has a first upper end portion 20 connected to the motor 12 by a coupling 22, and a second lower end portion 24 to which an impeller 26 is connected. A refractory shield 28 is disposed in an opening 30 in the motor mount 14. The motor 12 is mounted to the shield 28 by fasteners 40. The refractory shield 28 has a surface 29 that defines an opening 31 and circumscribes the shaft 18 extending through the shield 28. There is a clearance between the shaft 18 and the surface 29 allowing for rotation of the shaft 18. A gas feed apparatus 32 includes a source of gas 34 and a gas feed tube 36. The gas feed tube 36 extends from the gas source 34 through the shield 28 for injecting gas 37 from an outlet end portion 39 of the feed tube into the molten metal 16 and along the shaft 18.

The shield 28 includes a generally circular upper rim portion 38 that is fixed to the motor mount 14 such as by fasteners 40. A disk-like body portion 42 extends downward from the rim 38. It will be understood from the instant disclosure that the shield 28 may be configured in other geometrical shapes. Also, new pumps may be configured with the refractory shield 28 or existing pumps may be retrofitted with it by forming the opening 30 in the motor mount 14, disposing the shield 28 in the opening 30, and connecting the shield 28 to the motor mount 14.

The feed tube 36 of the gas feed apparatus 32 extends through an opening in the motor mount (not shown) or through an opening 35 in the refractory shield 28 to inject the gas 37 into the molten metal 16 along the shaft 18. The outlet end portion 39 is adjacent the upper end portion 20 of the shaft 18. As used throughout this disclosure, reference to the feed tube outlet end portion 39 as adjacent the shaft end portion 20 means that the end portion 39 is positioned radially with respect to the shaft 18 from as close to the shaft 18 as possible without touching it, to any location away from the shaft 18 at which the gas 37 will contact the shaft 18.

The refractory shield 28 protects sensitive components of the pump 10 such as the motor 12 from splashes of molten metal 16 caused by injecting the gas 37 into the molten metal 16. Because the shield 28 must withstand exposure to the molten metal 16, it is composed of a refractory material such as a ceramic material. One such ceramic material is nitride bonded silicon carbide.

Any gas source, such as a compressed gas tank and valve apparatus adapted to selectively release gas, may be used as the gas source 34. One compressed gas apparatus suitable for use in the present invention is sold by Gas Technics, located in Cleveland, Ohio. In the pump 10 shown in FIG. 1, an inert gas 37 that is heavier than air is injected through the feed tube 36. Since the gas 37 is heavier than air, it travels along the shaft 18 to the surface of the molten metal. Adjusting the valve of the gas source 34 regulates the amount of gas 37 that is injected into the molten metal. The gas 37 is usually trickled into the molten metal 16.

One or more gases heavier than air, selected from the group consisting of argon, krypton and xenon may be used, although argon gas is preferred. At 0 degrees C argon, krypton and xenon gases have densities of 1.7828 g/l, 3.6431 g/l and 5.7168 g/l, respectively, whereas air has a density of 1.2928 g/l.

By injecting the gas 37 through the gas feed tube 36, a gas barrier 44 is created that displaces air around the shaft 18. It is difficult for air above the molten metal 16 to penetrate the gas barrier 44 and oxidize the shaft 18. Deposit of oxidation formations on pump components in molten aluminum occur according to the reaction of oxygen and aluminum to produce $Al_2O_3$. The gas barrier 44 inhibits deposit of these oxidation formations on the shaft 18 by displacing the oxygen in the air surrounding the shaft 18. This permits the pump 10 to be operated for longer time periods without replacing the shaft 18, and hence increases pumping efficiency by reducing pump down time.

In normal operation of the pump 10 shown in FIG. 1, the pump 10 is lowered into the molten metal 16 and the motor 12 is activated to rotate the shaft 18 via the coupling assembly 22. Rotation of the shaft 18 rotates the impeller 26, which circulates the molten metal 16.

The gas feed source 34 is actuated to feed gas 37 into the gas feed tube 36. The gas 37 leaves the feed tube 36 at its outlet end portion 39 and flows down the shaft 18, above the molten metal 16. This inhibits deposit of oxidation formations on the shaft 18 during operation, above the molten metal 16.

Figure 2:
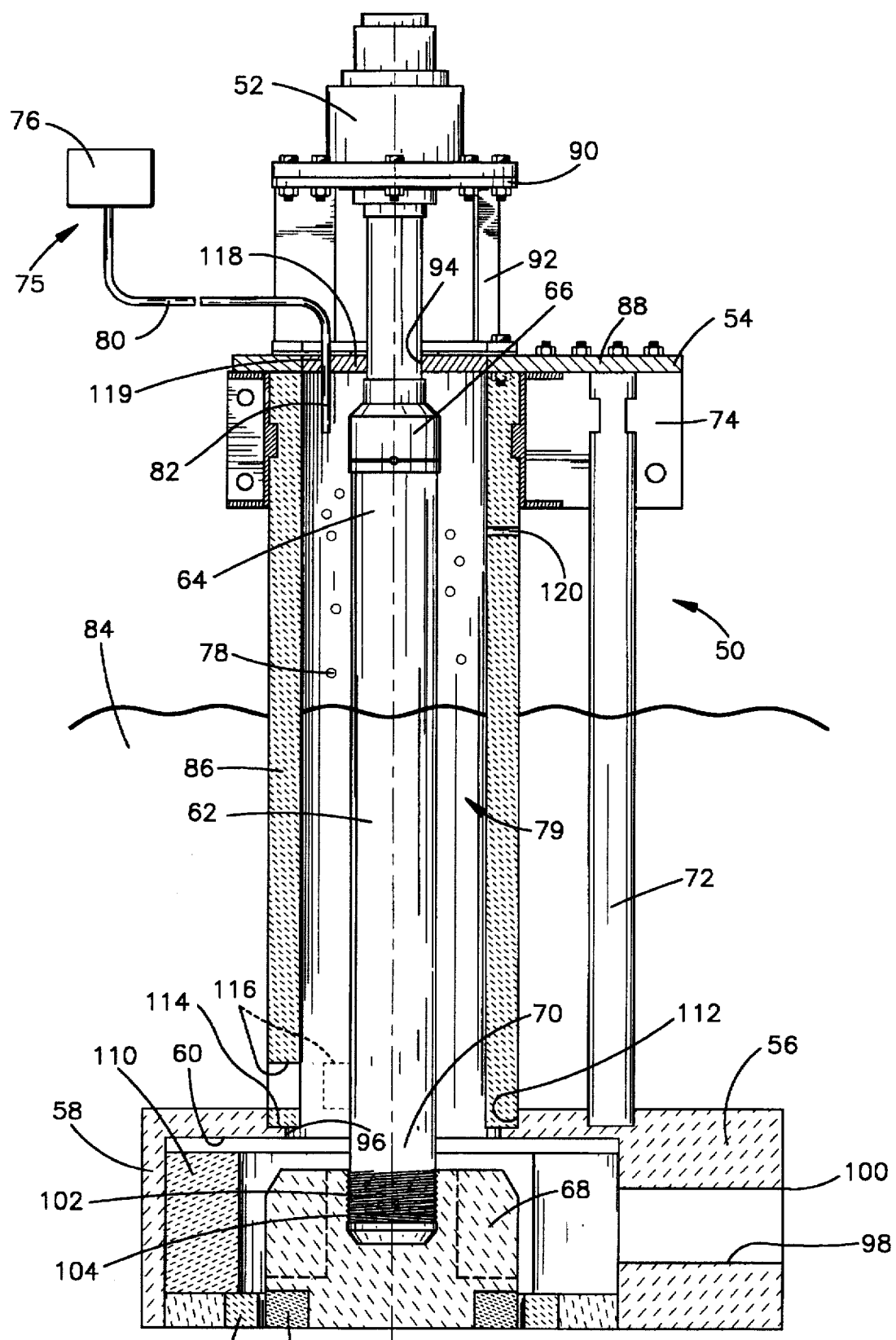
FIG. 2 is a vertical cross-sectional view of a discharge pump and a schematic illustration of a gas feed apparatus constructed in accordance with the invention.

Another embodiment of the invention shown in FIG. 2 is a top feed discharge pump designated generally by reference numeral 50. The pump 50 includes a motor 52 mounted to a motor mount 54. A base 56 has inner walls 58 defining an impeller chamber 60. A shaft 62 is connected to the motor 52 at a first upper end portion 64 by a coupling assembly 66. An impeller 68 is connected to a second lower end portion 70 of the shaft 62 and is rotatable in the impeller chamber 60. A support post 72 is disposed between the motor mount 54 and the base 56, and has its lower end fixed to the base 56. A clamp 74 is attached to the motor mount 54. A gas feed apparatus 75 includes a gas source 76 that supplies gas 78 through a gas feed tube 80 out of an outlet end portion 82 adjacent the upper end portion 64 of the shaft 62. The gas 78 flows along the shaft 62 above the molten metal 84, preventing oxidation along the length of the shaft 62 down to the surface of the molten metal.

The clamp 74 is preferably a quick release clamp of the type described in U.S. patent application to Thut, entitled "Pumps for Pumping Molten Metal", filed Feb. 8, 1995, which is incorporated herein by reference in its entirety. The clamp 74 releasably clamps the upper end portion of the support post 72 and the upper end portion of the shaft sleeve 86 if it is used.

The motor mount 54 is supported above the molten metal 84 and comprises a flat mounting plate 88 and a motor support portion 90 supported by legs 92. A hanger (not shown) is attached to the motor mount 54 for hoisting the pump 50 into and out of the furnace. The motor 52 is an air motor or the like, directly mounted onto the motor support portion 90. It will be understood from the instant disclosure that the invention is not limited to the particular configurations of the motor and the motor mount shown.

The shaft 62 is connected to the motor 52 by the coupling assembly 66, which is preferably constructed in the manner shown in U.S. pat. appln. No. 08/336,987 to Thut, filed Nov. 10, 1994, entitled "Shaft Coupling For A Molten Metal Pump", the disclosure of which is incorporated herein by reference in its entirety. The motor mount 54 includes an opening 94 in the mounting plate 88, which permits connecting the motor 52 to the shaft 62 via the coupling assembly 66.

The base 56 has an inlet opening 96 and a passage 98 leading to an outlet opening 100. The lower portion of the post 72 is cemented to the base in the well known manner.

The impeller 68 may have any configuration, but is preferably constructed in the manner shown in U.S. patent application to Thut, filed Mar. 7, 1995 and entitled "Dynamically Balanced Pump Impeller." The impeller 68 is attached to the lower end portion 70 of the shaft 62 such as by engagement of exterior threads 102 formed on the shaft 62 with corresponding interior threads 104 formed in the impeller 68. The impeller 68 includes an impeller bearing 106. A base bearing 108 surrounds the impeller bearing 106 for protecting the impeller 68 from impact with the base 56. The shaft 62, shaft sleeve 86, impeller 68, impeller bearing 106, and base bearing 108 are all composed of refractory material such as graphite or ceramic materials, to resist oxidation and erosion when these parts are subjected to the molten metal environment.

A volute member 110 is optionally used in the impeller chamber 60. The volute member 110 preferably has a spiral shape surrounding the impeller 68, as shown in FIG. 2. Use of a spiral volute such as the volute member 110 may produce advantageous molten metal flow properties as is known in the art.

If the shaft sleeve 86 is used, as shown in FIG. 2, it extends from the motor mount 54 to the base 56. An opening 112 surrounds the base inlet opening 96 and receives the shaft sleeve 86. A shoulder 114 is formed in the base 56 around the inlet opening 96, and supports the shaft sleeve 86. The shaft sleeve 86 is cemented in place on the shoulder 114. The shaft sleeve 86 contains multiple inlet openings 116 adjacent the base 56.

The gas feed tube 80 of the gas feed apparatus 75 extends from the gas feed source 76 so that its gas outlet end portion 82 is adjacent the upper end 64 of the shaft 62. However, the gas feed tube 80 may have any length and be disposed at any location along the shaft 62 so long as it directs the gas 78 along the outer surface of the shaft 62. It will be understood from the instant disclosure that the gas feed apparatus 75 may be used in circulation, transfer and discharge pumps.

The gas feed apparatus 75 injects gas 78 into the gas feed tube 80 out of its outlet end portion 82. An apparatus that is adapted to deliver gas, such as a compressed gas tank and valve assembly, may be used for the gas source 76. Gas 78 that is heavier or lighter than air may be used in the pump shown in FIG. 2, although gas 78 that is heavier than air is preferred.

If gas 78 that is lighter than air is used, such as nitrogen gas, the shaft sleeve 86 must be pressurized or sealed from outside air to force the gas 78 into the molten metal 84 along the length of the shaft 62. A gasket 118 or the like made of a material such as GRAFOIL® brand graphite foil, having a thickness of, for example, 1/16 inch, is employed to seal the shaft sleeve 86 from air outside the shaft sleeve. A vent hole 120 having, for example, a ¼ inch diameter, is used to vent gases 78 from the shaft sleeve 86 and prevent cavitation of the pump 50. The gas will then be injected at a pressure of 10 inches or less of water column and, preferably, at a pressure ranging from about 5–10 inches of water column when molten aluminum is used.

If gas 78 that is heavier than air is used, the shaft sleeve 86 need not be pressurized for the gas 78 to travel the length of the shaft 62. The shaft sleeve 86 guides the gas 78 along the shaft 62. Gases 78 that are heavier than air include argon, krypton, and zenon. The valve of the gas source 76 is adjusted to regulate flow of the gas 78 to preferably trickle gas down the shaft 62 to the surface of the molten metal.

It is advantageous to reduce the level of molten metal 84 in the shaft sleeve 86, since less torque is then required to rotate the shaft 62 therein. Regardless of whether the gas 78 is heavier or lighter than air, to reduce the level of molten metal 84 in the shaft sleeve 86 the shaft sleeve 86 must be pressurized. The shaft sleeve 86 is pressurized by disposing the gasket 118 on the upper end portion of the shaft sleeve 86 such that the feed tube 80 extends through the opening 119 and the shaft 62 extends through the opening 94. The shaft sleeve 86 is provided with the vent 120.

Gas 78 is then injected into the shaft sleeve 86 at a pressure exceeding the weight of the molten metal 84 in the shaft sleeve 86. This pressure is equivalent to about 5–10 inches of Hg column when molten aluminum is being pumped. When the level of molten metal 84 in the shaft sleeve 86 is reduced, the shaft 62 rotates in less molten metal 84 than it would normally. Thus, less torque is needed to rotate the shaft 62 when pumping molten metal 84.

In normal operation of the pump 50 shown in FIG. 2, the pump 50 is lowered into the molten metal 84 and the motor 52 is activated to rotate the shaft 62 via the coupling assembly 66. Rotation of the shaft 62 rotates the impeller 68, which circulates the molten metal 84. Rotation of the impeller 68 causes molten metal 84 to be fed into the top of the pump 50. The molten metal 84 enters the multiple inlet openings 116 of the shaft sleeve 86, flows through the base inlet opening 96, and then flows into the impeller chamber 60. The molten metal 84 is then directed by the impeller 68 through the base passageway 98 and is discharged out the outlet opening 100 to another bath of molten metal.

The gas feed apparatus 75 of the invention is utilized to supplement normal operation of the pump 50. If a gas 78 heavier than air is used, the gas source 76 is activated and, by regulating gas flow using a valve or the like, the gas 78 is fed into the gas feed tube 80. The gas 78 leaves the feed tube 80 through the outlet end portion 82 and flows down the shaft 62 above the molten metal 84. This forms a gas barrier 79 around and along the length of the shaft 62 down to the surface of the molten metal, preventing the deposit of oxidation formations on it.

If a gas 78 lighter than air is used, or if it is desired to lower the height of the molten metal 84 in the shaft sleeve 86, the shaft sleeve 86 is pressurized. Then, the gas source 76 is activated to inject the gas 78 into the gas feed tube 80, where it flows in the shaft sleeve 86 at a pressure ranging from 5–10 inches of Hg column in molten aluminum. This has the multiple advantageous effects of simultaneously inhibiting oxidation of the shaft 62, reducing torque on the shaft 62, and degassing the molten metal 84.

In another embodiment of the invention, a pump 50 of the type shown in FIG. 2 having a base 56 with an impeller chamber 60 is cleaned by removing oxidation formations on the impeller chamber walls 58. The pump 50 is cleaned in a cleaning cycle during which normal pumping of the molten metal 84 is suspended. The shaft sleeve 86 is pressurized by disposing the gasket 118 around the shaft 62. The gasket 118 is used to substantially seal the shaft sleeve 86 from air outside the shaft sleeve 86. The second outlet end portion of the gas feed tube 80 extends through the opening 119 in the gasket 118. A gas 78 is injected from the gas source 76 through the gas feed tube 80, out the feed tube outlet end 82, and into the impeller chamber 60.

The gas 78 is injected into the shaft sleeve 86 at a pressure of 10 inches of Hg column or less and, preferably, at a pressure ranging from 5–10 inches of Hg column when molten aluminum is being pumped. The gas 78 preferably includes one or more gases selected from the group consisting of chlorine, nitrogen or argon. Chlorine gas is the most preferable for this cleaning operation due to its reactive nature.

During the cleaning cycle, the impeller 68 is rotated on the end of the shaft 62 in the impeller chamber 60. This produces cavitation that dislodges oxidation formations from the impeller chamber walls 58. The oxidation formations dislodged from the impeller chamber walls precipitate from the molten metal 84 and float on the surface where they are removed by skimming. This embodiment of the invention is preferably used with circulation and discharge pumps.

Although the invention has been described in its preferred form with a certain degree of particularity, it will be understood that the present disclosure of the preferred embodiments has been made only by way of example and that various changes may be resorted to without departing from the true spirit and scope of the invention as hereafter claimed.

What is claimed is:

1. A gas feed apparatus for inhibiting oxidation formations in a pump for pumping molten metal of the type including a motor, a base having an impeller chamber, a shaft connected at a first end to the motor and at a second end to an impeller which is rotatable in the impeller chamber in a molten metal bath, and a tubular shaft sleeve surrounding said shaft and extending from near the first end of said shaft to a location adjacent the impeller, said gas feed apparatus comprising:

a gasket for sealing the shaft sleeve from air outside the shaft sleeve, said gasket being composed of heat insulating material having first and second openings, wherein said gasket is disposed near the first end of said shaft and receives said shaft in said first opening; and a gas feed tube for directing gas into the shaft sleeve, said feed tube having a first end portion connectable to a source of gas and an outlet end portion that can extend through said second gasket opening.

2. A method of impeding oxidation in a pump for pumping molten metal of the type including a motor and a shaft connected at a first end to the motor and at a second end to an impeller which is rotatable in a molten metal bath, comprising the steps of:

rotating the impeller on the end of said shaft in the molten metal, said shaft being comprised of a refractory material;

flowing gas adjacent an upper end of said shaft at a pressure below 5 inches of mercury column, wherein said gas comprises an inert gas having a density greater than air; and flowing said gas along an outer surface of said shaft to prevent deterioration of said shaft.

3. The method of claim 2 wherein the gas includes one or more gases selected from the group consisting of argon, krypton, xenon and nitrogen.

4. The method of claim 2 further comprising flowing the gas in an opening of a shaft sleeve, said shaft sleeve being disposed around the shaft between the motor and the base.

5. The method of claim 4 wherein the gas exits the shaft sleeve through one of a vent hole in the shaft sleeve and at least one molten metal inlet opening in the shaft sleeve.

6. The apparatus of claim 1 further comprising a vent hole in the shaft sleeve.

7. The apparatus of claim 6 further comprising at least one molten metal inlet opening in the shaft sleeve disposed below said vent hole.

8. A method of cleaning a pump for pumping molten metal of the type including a motor, a base having a molten metal inlet opening and a different molten metal outlet opening and inner and outer wall surfaces, the inner wall surfaces defining an impeller chamber, and a shaft connected at a first end to the motor and at a second end to an impeller which is rotatable in the impeller chamber in a molten metal bath, comprising the steps of:

submerging the base so that the outer wall surfaces are contacted by molten metal;

injecting gas into an opening of a conduit, the conduit extending between the motor and the base, and into the impeller chamber at a pressure effective to produce cavitation when rotating the impeller in the impeller chamber;

dislodging oxidation formations from the impeller chamber walls by said cavitation; and removing said dislodged oxidation formation from said impeller chamber.

9. The method of claim 8 wherein said conduit is a shaft sleeve having the opening, further comprising the step of substantially sealing the opening of the shaft sleeve from air outside the shaft sleeve.

10. The method of claim 8 wherein the gas is injected into the opening of said conduit at a pressure sufficient to reduce the height of molten metal in the opening of said conduit.

11. The method of claim 8 wherein the gas includes one or more gases selected from the group consisting of chlorine, nitrogen and argon.

12. A method of cleaning a pump for pumping molten metal of the type including a motor, a base having inner walls defining an impeller chamber, and a shaft connected at a first end to the motor and at a second end to an impeller which is rotatable in the impeller chamber in a molten metal bath, comprising the steps of:

injecting gas into an opening of a conduit, the conduit extending between the motor and the base, and into the impeller chamber;

rotating the impeller in the impeller chamber to produce cavitation;

dislodging oxidation formation from the impeller chamber walls by said cavitation;

interrupting normal pumping of the molten metal before injecting gas into the impeller chamber, removing the dislodged formations from the impeller chamber after said dislodging step, and resuming the normal pumping of the molten metal.

* * * * *